3,357,978
PROCESS FOR PREPARING NEW BENZAMIDES
Michel Leon Thominet, Paris, France, assignor to Societe
d'Etudes Scientifiques et Industrielles de l'Ile-de-France,
Paris, France
No Drawing. Filed Feb. 28, 1964, Ser. No. 348,255
Claims priority, application France, Mar. 5, 1963,
926,941
7 Claims. (Cl. 260—247.1)

This invention relates to a new method of preparing certain benzamides. More specifically, it relates to a new method of preparing benzamides of the formula:

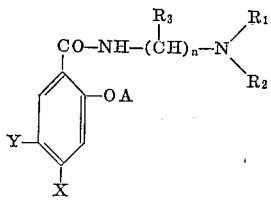

in which:

A is selected from the group consisting of lower alkyl and the group

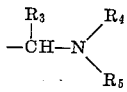

X is selected from the group consisting of amino, alkylamino, dialkylamino and alkanoylamino;
Y is selected from the group consisting of halogen, hydroxy, lower alkoxy, nitro, amino, alkylamino, dialkylamino, alkanoylamino, alkanoyl, mercapto and sulfamoyl;
$n$ is a positive whole number less than 4 and greater than 1;
$R_1$, $R_2$, $R_4$ and $R_5$ are selected from the group consisting of lower alkyl and the combinations of $R_1$ and $R_2$ and $R_4$ and $R_5$ each into heterocyclic rings selected from the group consisting of morpholyl, piperidyl, pyrrolidyl, N-alkyl piperazyl and N-alkylsulfonylpiperazyl; and
$R_3$ is selected from the group consisting of hydrogen and lower alkyl;
which comprises the combination, in this specific order, of the steps of esterifying p-aminosalicyclic acid, acylating the amino group, alkylating the phenolic hydroxyl, introducing the group Y into the ring, condensing the product with the amine

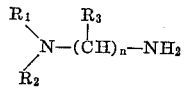

and deacylating the p-amino group.

In French Patents 1,159,180 of Apr. 28, 1954, 1,311,114 of Apr. 5, 1960 and 1,313,758 of July 25, 1962, the preparation of substituted N-tertiary aminoalkyl benzamides has already been described. For this purpose a substituted acid chloride is reacted with an asymmetric disubstituted diamine in a reaction medium such that the benzamide hydrochloride formed can be recovered in pure state by filtration or centrifuging.

It has been found during the course of further studies— and this constitutes the object of the present invention— that one could prepare in an original manner subsituted benzamides of the formula:

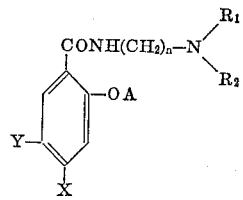

in which:

A is either hydrogen or an alkyl radical such as —CH$_3$, —C$_2$H$_5$, —n—C$_3$H$_7$, —iso—C$_3$H$_7$, n—C$_q$H$_{2q}$+1, —iso—C$_q$H$_{2q}$+1, or else a radical of the form:

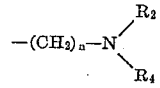

X being an amino, alkylamino, dialkylamino or acylamino radical;
Y being a halogen, or a hydroxy, alkoxy of low molecular weight, nitro, amino, alkylamino, dialkylamino, acylamino, acyl of low molecular weight, mercapto or sulfamido;
$n$ being equal to 2 or 3;
one of the CH$_2$ groups of A or of the carboxamide function can be branched in the form

with for instance $R_5$=CH$_3$,
$R_1$, $R_2$, $R_3$, $R_4$ are identical or different alkyl radicals of low molecular weight;
The

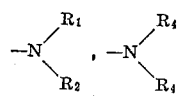

groups can form a heterocycle such as morpholyl, piperidyl, pyrrolidyl, N-alkyl piperazyl, or N-alkylsulfonylpiperazyl.

In accordance with this invention, the method of preparing these benzamides employs as starting material p-amino salicyclic acid which is esterified. The amine function of the p-amino salicyclic acid obtained is then acetylated. The phenol function of the acetylated derivative is then alkylated by a suitable alkylating agent—alkyl halide, alkyl sulfate, alkyl benzene—or toluene-sulfonate, etc. The substituent is then fixed in 5-position on the ring. The ester function is transformed into an amide function by heating with an asymmetrically disubstituted diamine and the acetylated derivative is hydrolyzed to obtain the corresponding amino derivative.

The introduction of the groups Y into the 5-position involve various reactions. Halogens are introduced by direct halogenation in the cold. Chlorine and bromine are the usual halogens introduced. The reaction is carried out in an inert solvent such as acetic acid. Nitration is carried out in a mixed acid, such as nitric and acetic acid. Nitro groups are reduced by catalytic hydrogenation, metal and acid, or similar acid methods to give amino groups. Reductive alkylation, such as catalytic reduction in the presence of formaldehyde gives alkylamino groups. The amino group is replaced by hydroxyl by means of diazotization and hydrolysis and the resulting hydroxyl can be alkylated to alkoxy.

These various stages of the synthesis can be clarified, by way of example, in the case of a halogen bound in 5-position on the ring, by the table appended at the end of the present patent.

The preparation of the following compounds is given by way of illustration and without in any way limiting the invention.

EXAMPLE I

Dihydrochloride of N-(diethylaminoethyl)-2-methoxy-4-amino-5-chlorobenzamide

STEP A

*Preparation of methyl p-amino salicylate.*—In a 6-liter flask provided with a mechanical agitator and a reflux condenser, there are introduced 1875 grams of absolute methanol and then, in small portions, while cooling, 970 grams of sulfuric acid of 93% purity and finally 383 grams (2.5 mole) of p-amino salicylic acid (PAS). The resultant suspension is heated under reflux with agitation for 5 to 6 hours. The dissolving takes place rather rapidly. It is cooled to about 30° C. and the mixture then poured with agitation into a solution of 12.5 liters of water containing 975 grams of dry sodium carbonate. The methyl p-amino salicylate formed precipitates out in solid state. It is centrifuged, and washed with water until disappearance of the sulfate ions. The product is then dried at 60° C.; there are obtained 361 grams of crystals melting at 119° C. (yield 86%).

STEP B

*Preparation of methyl p-acetylamino salicylate.*—Into a 2-liter flask provided with an agitator, a thermometer and a dropping funnel, there are introduced 361 grams (2.16 mole) of methyl p-amino salicylate and 725 ml. of absolute alcohol. The rather thick paste obtained is heated to 40° C. and a start is then made with pouring therein with agitation, in small portions, 225 grams (2.16 mole) of acetic anhydride. The addition of acetic anhydride is controlled in such a manner that the temperature of the reaction mixture does not exceed 50° C. The pasty mass dissolves gradually and the solution becomes clear toward the end of the addition of the anhydride. About one-quarter of an hour after the end of the anhydride addition, the acetylate ester crystallizes in a very thick slurry. It is cooled to 20° C. and 500 ml. of water added, whereupon this reaction mixture is poured into 7 liters of water. It is agitated for 1½ hours, centrifuged and washed on a filter with 2 liters of water.

The precipitate is dried at 55 to 60° C. There are obtained 427 grams of methyl p-acetylamino salicylate (yield 94%). M.P.: 152 to 153° C.

STEP C

*Preparation of methyl-2-methoxy-4-acetylamino benzoate.*—Into a 5-liter flask provided with an agitator and a reflux condenser, there are placed 427 grams of methyl p-acetylamino saliclylate and 1500 ml. of acetone. Heating is effected until dissolved (about 48° C.). 276 grams (2 mole) of potassium carbonate and then 277 grams (2 mole+10%) of methyl sulfate are then rapidly added. Heating is continued until the mixture boils. There is very rapidly noted a great thickening of the reaction mixture which is very difficult to agitate. About 15 minutes after the addition of the methyl sulfate, the reaction mixture becomes fluid. Heating is continued under reflux for 15 hours; about 1.200 liters of acetone are then distilled off, and the residue is cooled to about 50° C. and diluted with 2.500 liters of water. The methyl 2-methoxy-4-acetylamino benzoate formed precipitates. It is set aside overnight, centrifuged and washed until neutral. The precipitate is then dried at about 55–60° C. There are obtained 348 grams of product (yield 78.5%). M. P.: 127° C.

STEP D

*Preparation of methyl 2-methoxy-4-acetylamino-5-chlorobenzoate.*—Into a 3-liter flask provided with an agitator, a thermometer and a gas inlet tube, there are place 348 grams of methyl-2-methoxy-4-acetylamino benzoate and 1800 ml. of acetic acid. Heating is effected at 30° C. to dissolve the mixture. It is then cooled to about 15° C. and a stream of chlorine introduced while maintaining the temperature between 15 and 20° C. The feeding of the chlorine is stopped when an increase in weight of 112 grams (1.56 moles) is noted. The reaction mixture is poured into 19 liters of water. The precipitate is set aside for one hour, centrifuged and washed with water until disappearance of the chlorine ions. It is then dried at 60° C. There are obtained 345 grams of methyl 2-methoxy-4-acetylamino-5-chlorobenzoate (yield: 86%). M.P. 153° C.

STEP E

*Preparation of N - (diethylaminoethyl)-2-methoxy-4-acetylamino-5-chlorobenzamide.*—Into a 5-liter flask provided with an agitator and a Vigreux distillation column of a height of about 30 cm., there are introduced 345 grams of methyl-2-methoxy-4-acetylamino-5-chlorobenzoate, 670 ml. of xylene and 156 grams of N,N-diethylethylene diamine. The mixture partially dissolves. 67 grams of aluminum isopropylate are then added. It is heated gently at the boiling point so that the temperature of the solution at the top of the column is maintained between 65 and 80° C. maximum (xylenemethanol azeotrope 63–65° C.). In 2½ hours, there are collected 85 ml. of distillate corresponding to 50 ml. of methanol. The fraction passing over at about 135° C. (xylene) is then distilled again for 1½ hours and then allowed to cool. Crystallization takes place. The crystals are taken up with 1600 ml. of water and about 400 ml. of concentrated hydrochloric acid; there is practically complete dissolving of the mixture which is filtered. The xylene layer is decanted and the aqueous solution is reprecipitated by a 30% excess of soda (600 ml.). The base is precipitated, centrifuged in the cold and washed with water. The product is kept "as is" to be subjected immediately to hydrolysis.

STEP F

*Preparation of N - (diethylaminoethyl)-2-methoxy-4-amino-5-chlorobenzamide.*—The crude product obtained in the preceding step is treated with 1340 ml. of concentrated hydrochloric acid and 2200 ml. of water. The resultant mixture is boiled for 1½ hours under reflux. The reaction product is then boiled for 10 minutes with 2 or 3 grams of animal charcoal. It is cooled and filtered. The filtered solution is precipitated with soda until alkalined by phthalein. The crystalline product obtained is centrifuged and washed with water until disappearance of the chlorine ions. In this way there are obtained 260 grams of N - (diethylaminoethyl) - 2-methoxy-4-amino-5-chlorobenzamide. M.P. 144° C. (Total yield of Steps E and F: 65%.)

STEP G

*Preparation of the dihydrochloride of N-(diethylaminoethyl)-2-methoxy-4-amino-5-chlorobenzamide.*—The 260 grams of base obtained in Step F are dissolved in 600 ml. of boiling absolute alcohol. A slight amount of insoluble matter is filtered off.

Washing is effected with 200 ml. of alcohol. An alcoholic solution of 73 grams of dry hydrochloric acid dissolved in 250 ml. of absolute alcohol and 20 ml. of water is added. It is set aside for ½ hour and seeded. The crystalline precipitate obtained is centrifuged in the cold, washed carefully with about 200 ml. of alcohol and dried at 40° C. There are obtained 285° grams of the dihydrochloride of N-(diethylaminoethyl)-2-methoxy-4-amino-5-chlorobenzamide. M.P.: 136–137° C.

EXAMPLE II

Dihydrochloride of N-(diethylaminoethyl)-2-methoxy-4-amino-5-bromobenzamide

Steps A, B and C of this preparation are the same as those described in Example I.

STEP D

*Preparation of methyl-2-methoxy - 4 - acetylamino - 5-bromobenzoate.*—In a 2-liter flask provided with agitator, a thermometer and a dropping funnel, there are placed 117 grams (0.524 mole) of methyl-2-methoxy-4-acetylaminobenzoate and 585 ml. of acetic acid. Heating is effected at 40° C. until complete dissolving is obtained, followed then by cooling to 15° C. Into the resultant cloudy solution, there are introduced, drop by drop, in the course of one hour, while maintaining the temperature between 15 and 20° C., 87 grams of bromine (0.524 mole+4% excess). There is a slight liberation of hydrobromic acid and toward the middle of the reaction, the bromine derivative formed crystallizes. After the introduction has been completed, the reaction mixture is poured into 5.850 liters of water. The precipitate is centrifuged, washed with water until the disappearance of the bromine ions and dried in an oven at 40° C. There are obtained 152 grams (yield: 96%) of methyl-2-methoxy-4-acetylamino-5-bromobenzoate. M.P.: 174° C.

STEP E

*Preparation of N-(diethylaminoethyl)-2 - methoxy - 4-amino-5-bromobenzamide.*—Into a 2-liter flask provided with a reflux condenser, there are introduced 152 grams of methyl-2-methoxy-4-acetylamino-5 - bromobenzoate, 460 ml. of ethylene glycol and 174 grams (3 times the theoretical quantity) of N,N - diethylethylenediamine. Heating is effected on an oil bath at 120° C. under a nitrogen atmosphere for 2 hours.

The dissolving is complete upon the start of the heating. At the end of 2 hours, without cooling, the reaction mixture is transferred into a 5-liter flask provided with a reflux condenser and there are added 460 ml. of 2.5 N soda which has been previously heated to 95 to 100° C. Heating is effected under reflux for 30 minutes in a nitrogen atmosphere. Two layers are formed, the oily amine layer settles in the bottom of the flask. Upon cooling and agitation, this layer solidifies. The mixture is diluted with 460 ml. of water and agitated further for a quarter of an hour. The precipitate formed is centrifuged, washed with water and dried in the oven at 50° C. There are obtained 140 grams of N-(diethylaminoethyl)-2-methoxy-4-amino - 5 - bromobenzamide (yield: 81%); M.P.: 149° C.

STEP F

*Preparation of the dihydrochloride of N-(diethylaminoethyl)-2-methoxy-4-amino-5 - bromobenzamide monohydrate.*—140 grams of the base coming from Step E are dissolved in 420 ml. of alcohol close to the boiling point. The cloudy solution obtained is filtered rapidly. To this solution, cooled to about 50° C. and partially recrystallized, there is added an alcoholic solution of 30 grams of dry hydrochloric acid in 120 ml. of absolute alcohol and 10 ml. of water. There is total redissolving. It is cooled to about 20° C. The crystallization starts to commence. It is set aside overnight in the icebox. The next day the precipitate is filtered, washed on the filter with 70 ml. of absolute alcohol and dried at 40° C. There are obtained 132 grams of dihydrochloride crystallizing with one mole of water (yield: 74%). M.P.: 134–136° C.

EXAMPLE III

Hydrochloride of N-(diethylaminoethyl) - 2 - ethoxy - 4-amino-5-chlorobenzamide Steps A and B are identical to those described in Example I of the present patent.

STEP C

*Preparation of methyl-2-ethoxy - 4 - acetylaminobenzoate.*—In a 2-neck 3-liter flask with agitator, reflux condenser and thermometer, there are placed 180 grams (0.86 mole) of methyl-4-acetylamino salicylate and 645 ml. of acetone. It is heated to 40° C. to obtain a clear solution. There are then rapidly added 119 grams (0.86 mole) of anhydrous potassium carbonate and 146 grams (0.86 mole+10% excess) of ethyl sulfate. Heating under reflux is effected for 19 hours. Thereupon about 440 ml. of acetone are distilled. The product crystallizes. 2.500 liters of water are added to the cooled solution. The product is centrifuged, and washed on the filter with water. There are obtained 198 grams (97%) of methyl-2-ethoxy-4-acetylaminobenzoate. M.P.: 145° C.

STEP D

*Preparation of methyl-2-ethoxy-4-acetylamino-5-chlorobenzoate.*—Into a 2-neck, 6-liter flask with thermometer and gas inlet tube, there are placed 198 grams of methyl-2-ethoxy-4-acetylaminobenzoate and 2.400 liters of acetic acid. Heating is effected to about 40° C. to obtain a clear solution. It is cooled to about 15° C. and while maintaining this temperature, a stream of chlorine is passed through until there is an increase in weight of 60 grams. The introduction requires about ½ hour. The reaction mixture is poured into 24 liters of water. The resultant precipitate is centrifuged, washed with water until the disappearance of the chlorine ions, and dried in an oven at 40° C. There are obtained 191 grams (yield: 83%) of methyl-2-ethoxy-4-acetylamino-5-chlorobenzoate. MP: 142° C.

STEP E

*Preparation of N - (diethylaminoethyl) - 2 - ethoxy - 4-amino-5-chlorobenzamide.*—Into a 3-liter flask with reflux condenser, there are introduced 191 grams of methyl-2-ethoxy-4-acetylamino-5-chlorobenzoate and 640 ml. of ethylene glycol and 243 grams (3 times the theoretical quantity) of N,N-diethylethylenediamine. Heating is effected at 120° C. on an oil bath for 2¼ hours. The reaction mixture is poured into a 5-liter flask and 640 ml. of 2.5 N soda which has been previously heated to 95–100° C. are added. A very abundant precipitate is then obtained, and the heating under reflux is continued for ½ hour. The mixture is cooled and diluted with 640 ml. of water. The product is centrifuged, washed with water until neutral and dried in an oven at 40° C. There are obtained 191 grams (yield: 86.5%) of N-(diethylaminoethyl) - 2 - ethoxy - 4 - amino-5-chlorobenzamide, M.P.: 151–152° C.

STEP F

*Preparation of N - (diethylaminoethyl) - 2 - ethoxy - 4-amino-5-chlorobenzamide.*—By operating as in Step G of Example I, the corresponding hydrochloride is obtained from the base obtained in the previous step. M.P.: 175–180° C. (with decomposition).

EXAMPLE IV

N-(diethylaminopropyl)-2-methoxy-4-amino-5-chlorobenzamide

Steps A, B, C, and D of this preparation are similar to those described in Example I of the present patent.

STEP E

*Preparation of N-(diethylaminopropyl)-2-methoxy-4-amino-5-chlorobenzamide.*—In a two-liter flask, there is heated for three hours on an oil bath at 100° C. a mixture of 78 grams (0.3 mole) of methyl-2-methoxy-4-acetylamino-5-chlorobenzoate, 78 grams (0.6 mole) of diethylaminopropylamine and 235 ml. of ethylene glycol. To the resultant hot solution, there are added 240 ml. of a boiling 2.5 N soda solution. Heating is effected under reflux for 30 minutes. Dilution is effected with 2 liters of water. The benzamide formed crystallizes. It is centrifuged and washed abundantly with water. There are obtained 70 grams of N-(diethylaminopropyl)-2-methoxy-4-amino-5-chlorobenzamide (yield: 74%). M.P.: 79–80° C. This base gives a monohydrochloride. M.P.: 188–189° C.

EXAMPLE V

*Hydrochloride of N-(diethylaminoethyl)-2-methoxy-4-amino-5-nitrobenzamide*

Steps A, B, and C of this preparation are the same as those described in Example I.

STEP D

*Preparation of methyl-2-methoxy-4-acetylamino-5-nitrobenzoate.*—In a 2-liter flask provided with agitator, thermometer and a dropping funnel, there are dissolved 223 grams (1 mole) of methyl-2-methoxy-4-acetylaminobenzoate and 337 grams of acetic anhydride. A slight heating is effected to facilitate this dissolving, the mixture is cooled to 15° C. and 106 grams of fuming nitric acid (D=1.49) dissolved in 75 ml. of acetic acid are added, drop by drop, with agitation. The temperature is maintained at about 40° C. The nitro derivative formed crystallizes during the course of the reaction.

The reaction mixture is cooled and poured into 5 liters of water. It is centrifuged, washed with water and dried. There are obtained 183 grams (yield: 68%) of methyl-2-methoxy-4-acetylamino-5-nitrobenzoate.

STEP E

*N-(diethylaminoethyl)-2-methoxy-4 - amino - 5 - nitrobenzamide.*—Into a 3 liter flask, there are introduced 183 grams of methyl-2-methoxy-4 - acetylamino-5 - nitrobenzoate, 540 grams of ethylene glycol and 237 grams of N,N-diethylethylenediamine. The mixture is heated at 45° C. for 100 hours. The flask is then placed on an oil bath at 100° C. and 520 ml. of 2.5 N soda previously heated to about 95° C. are added. The heating is continued for an hour and a half at 100° C., which results in a liquefaction of the mixture. It is taken up in 600 ml. of water. It is cooled, and the compound formed crystallizes. The latter is centrifuged, washed with water until the wash waters are no longer basic, and then dried at 50° C. There are obtained 95 grams of N-(diethylaminoethyl)-2-methoxy - 4 - amino - 5 - nitrobenzamide (yield: 45%). M.P.: 208–9° C.

STEP F

*Preparation of hydrochloride of N-(diethylaminoethyl)-2-methoxy-4-amino-5-nitrobenzamide.*—Following the same technique as that described in Step G of Example I, one obtains from the base obtained in Step E the corresponding monohydrochloride. M.P.: 178–179° C.

Similarly, when the process of Steps A through F are followed, using p-ethylaminosalicylic acid and p-diethylaminosalicylic acid as the starting material, there are obtained the corresponding 4-ethylamino and diethylamino products. The acylation step is not needed in the latter case.

In Step F, if the addition of soda is omitted, the product being crystallized by addition of water, there is obtained the corresponding 4-acetylamino-5-nitro amide.

EXAMPLE VI

*Dihydrochloride of N-(diethylaminoethyl)-2-methoxy-4,5-diamino benzamide*

Starting from the N-diethylamino-ethyl)-2-methoxy-4-amino-5-nitrobenzamide obtained in Step E of Example V, one obtains by catalytic or chemical reduction N-(diethylaminoethyl) - 2 - methoxy - 4,5-diaminobenzamide, which gives a dihydrochloride. M.P.: 190–191° C. (with decomposition).

Similarly, catalytic reduction of the N-(diethylaminoethyl)-2-methoxy-4-acetamido-5-nitrobenzamide gives N-(diethylaminoethyl)-4-acetamido-5-aminobenzamide.

EXAMPLE VII

The procedure of Example I is followed, using, in place of N,N-diethylethylenediamine in Step E, an equivalent quantity of each of the following:

1-amino-2-diethylaminopropane
N,N-dimethylethylenediamine
N-ethyl-N-propylethylenediamine
2-N-morpholinoethylamine
2-N-piperidylethylamine
2-N-pyrrolidylethylamine
2-(4-methyl-1-piperazyl)ethylamine
2-(4-methylsulfonyl-1-piperazyl)ethylamine.

There is formed at the end of Step F the corresponding N-substituted 2-methoxy-4-amino-5-chlorobenzamide.

EXAMPLE VIII

When, in Step C of Example I, there is used an equivalent quantity of diethyl sulfate in place of methyl sulfate, the product obtained in Step F is N-diethylaminoethyl-2-ethoxy-4-amino-5-chlorobenzamide.

Similarly, when diethylaminoethylbromide is used in place of methyl sulfate, the corresponding 2-diethylaminoethoxy compound is obtained.

EXAMPLE IX

*N-(diethylaminoethyl)-2-methoxy-4-amino-5-dimethylamino benzamide*

The reduction of Example VI is carried out by hydrogenation at 40 p.s.i. over Raney nickel in dimethoxyethane containing an excess of 37% aqueous formaldehyde and acetic acid. The product is isolated by filtration, evaporation to dryness, extraction with ether, washing of the extract with aqueous bicarbonate and evaporation of the dried ether solution. It is N-(diethylaminoethyl)-2-methoxy-4-amino-5-dimethylaminobenzamide.

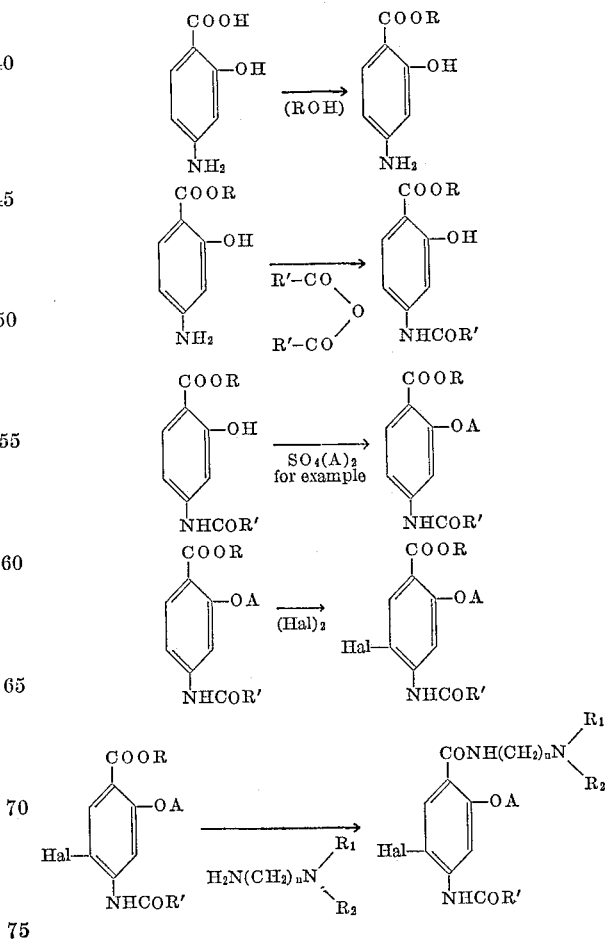

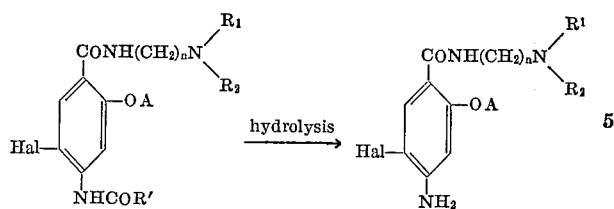

I claim:
1. A method of preparing a compound of the formula:

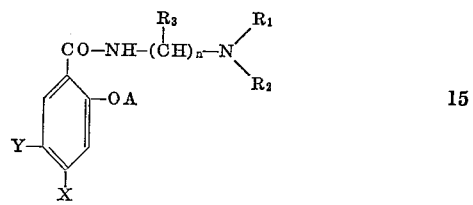

in which

A is selected from the group consisting of lower alkyl and the group

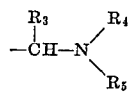

X is selected from the group consisting of amino, alkylamino, dialkylamino and alkanoylamino;
Y is selected from the group consisting of halogen, hydroxy, lower alkoxy, nitro, amino, alkylamino, dialkylamino, alkanoylamino, alkanoyl, mercapto and sulfamoyl;
n is a positive whole number less than 4 and greater than 1;
$R_1$, $R_2$, $R_4$ and $R_5$ are selected from the group consisting of lower alkyl and together with the nitrogen form morpholino, piperidino, pyrrolidino, N-alkylpiperazino and N-alkylsulfonylpiperazino; and $R_3$ is selected from the group consisting of hydrogen and lower alkyl, which comprises, in combination, the successive steps of:
  (a) esterifying p-aminosalicylic acid;
  (b) acylation of the amino group of the resulting p-aminosalicylate with a lower alkanoic acid;
  (c) alkylating the o-hydroxy group of the product of step (b) with a group A, as defined above;
  (d) introducing the group Y into the product of step (c);
  (e) heating the product of step (d) with an amine of the structure:

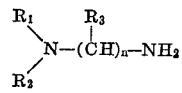

to form an amide; and
  (f) deacylating the p-amino group.

2. The procedure of claim 1 in which step (d) comprises halogenation in the cold.
3. The procedure of claim 2 in which the halogen is chlorine.
4. The procedure of claim 2 in which the halogen is bromine.
5. The procedure of claim 1 in which step (d) is nitration.
6. The procedure of claim 1 in which step (d) is nitration followed by reduction.
7. The procedure of claim 1 in which step (d) is successively, nitration, reduction and acylation.

References Cited

FOREIGN PATENTS 1,313,758    11/1962    France.

NICHOLAS S. RIZZO, *Primary Examiner.*

J. TOVAR, *Assistant Examiner.*

UNITED STATES PATENT OFFICE
CERTIFICATE OF CORRECTION

Patent No. 3,357,978                            December 12, 1967

Michel Leon Thominet

It is hereby certified that error appears in the above numbered patent requiring correction and that the said Letters Patent should read as corrected below.

Column 2, lines 37 to 40, the second formula should appear as shown below instead of as in the patent:

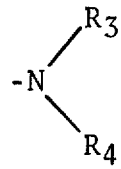

Signed and sealed this 11th day of February 1969.

(SEAL)
Attest:

Edward M. Fletcher, Jr.                                 EDWARD J. BRENNER
Attesting Officer                                             Commissioner of Patents